Feb. 6, 1923.
E. R. HADDEN.
PEDAL OPERATED ACCELERATING ATTACHMENT.
FILED AUG. 8, 1921.
1,444,117.
2 SHEETS—SHEET 2.
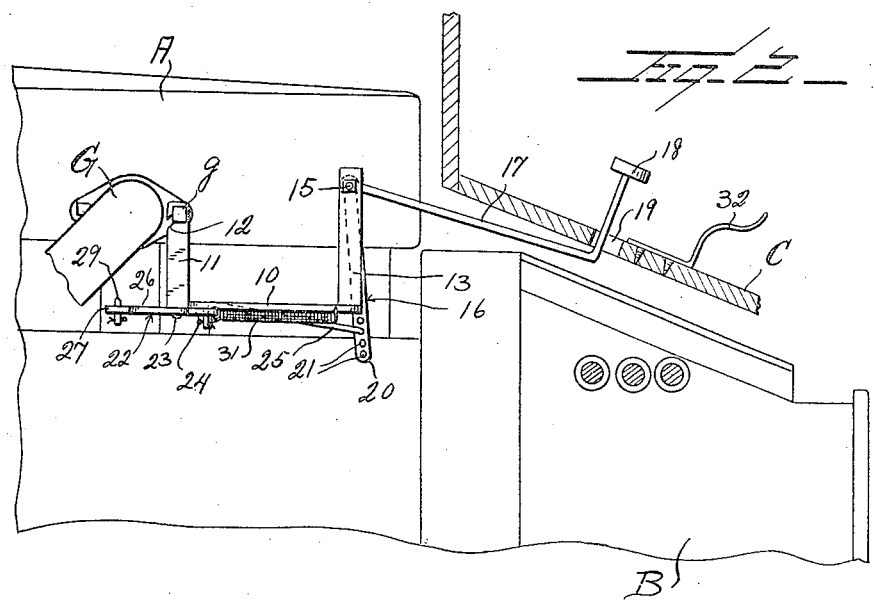
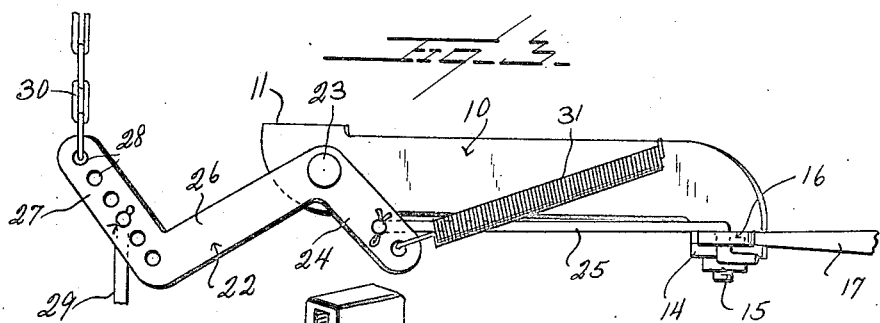
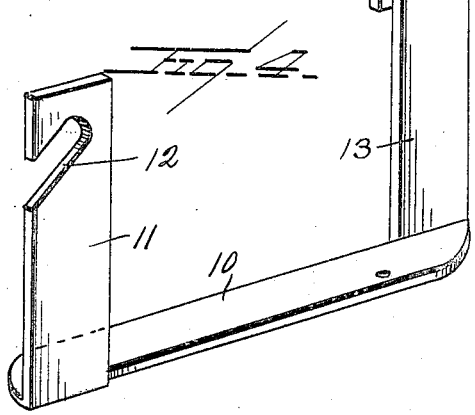
Inventor
E. R. Hadden
By Watson E. Coleman
Attorney Patented Feb. 6, 1923.

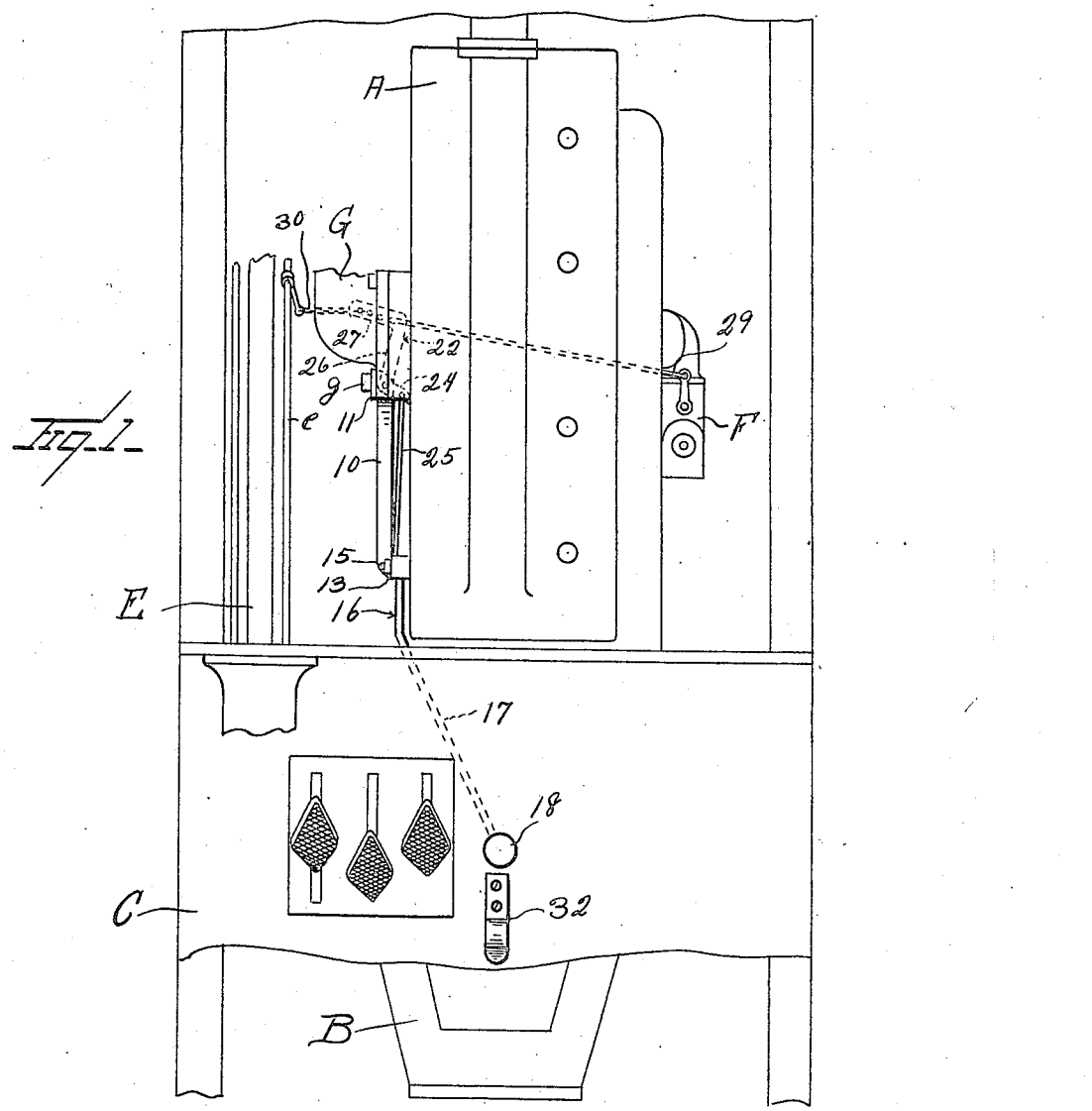

1,444,117

UNITED STATES PATENT OFFICE.

ERNEST R. HADDEN, OF ADRIAN, MICHIGAN.

PEDAL-OPERATED ACCELERATING ATTACHMENT.

Application filed August 8, 1921. Serial No. 490,591.

*To all whom it may concern:*

Be it known that I, ERNEST R. HADDEN, a citizen of the United States, residing at Adrian, in the county of Lenawee and State of Michigan, have invented certain new and useful Improvements in Pedal-Operated Accelerating Attachments, of which the following is a specification, reference being had to the accompanying drawings.

This invention relates to accelerators for motor cars, and particularly to an accelerator attachment adapted to be applied to Ford motor cars whereby the throttle valve may be controlled by means of a foot pedal.

In the Ford car and in other similar types of car, the throttle valve is controlled by a lever mounted in conjunction with the steering wheel. The shaft of this lever extends down parallel to the steering post and is connected at its lower end by a transverse rod to the arm of the throttle valve. In cars of this type the driver's seat is disposed on the left hand side of the machine, while the carbureter is on the right hand side of the machine, and in the midst of crowded traffic it is necessary that the driver of the car should use both hands on the steering wheel, thus making it difficult for him at the same time to control the hand accelerator mounted in conjunction therewith.

The general object of my invention is to provide an attachment which may be readily applied to Ford cars of all types, this attachment including a pedal designed to project up above the foot board of the machine, and provide means whereby the throttle lever may be operated by means of this pedal, the attachment also permitting of the regular operation of the throttle by means of the hand control throttle lever adjacent the steering wheel.

A further object is to provide a device of this character which is very simple, which can be readily attached to the engine of the Ford automobile without in any way changing the position of any of the parts of the engine and without the necessity of even making an opening in the foot board through which the pedal rod may project.

Another object is to provide a device of this character which does not rest upon and is not mounted upon the foot board in any way, the reason being that the foot boards of Ford motor cars, particularly old cars, are liable to become broken, weak and springy.

Other objects will appear in the course of the following description.

My invention is illustrated in the accompanying drawings, wherein:—

Figure 1 is a top plan fragmentary view of a portion of a Ford motor car showing my invention applied thereto;

Figure 2 is a fragmentary vertical sectional view through the motor car showing the engine in elevation and my device applied thereto;

Figure 3 is an under side plan view of the bracket 10, showing the position of the lever 26 and the spring;

Figure 4 is a perspective view of the bracket 10;

Figure 5 is a perspective view of the link 29.

Referring to these drawings, A designates the engine of a motor car of the Ford type and B the transmission case thereof, C designating the foot board through which the operating pedals of the car project. E designates the steering post and $e$ the usual throttle controlling shaft extending parallel to the steering post and carrying the usual handle adjacent the steering wheel. My attachment comprises a bracket, designated 10, which is made of strap iron, one end of the bracket at its outer edge being upwardly turned, as at 11, and formed with an opening 12, this opening preferably extending to the edge of the web 11. At its opposite end the body 10 of the bracket on its inside edge is upwardly extended, as at 13, to form a supporting post and is then downwardly rebent upon itself, as at 14. Pivoted by means of a bolt 15 between the portions 13 and 14 is a bell crank lever 16 having a relatively long, rearwardly extending arm 17 which extends through the plane of the dash board and is upwardly extended and provided with a head or foot pedal 18.

The floor boards of all Ford cars are provided with an opening 19, through which this upwardly extending shank of the foot pedal 18 can project so that there is no necessity of boring a hole through the foot board in order to accommodate the pedal. The downwardly extending arm 20 of the bell crank lever 16 is provided with a plurality of perforations 21.

Pivotally mounted upon the under face of the bracket 10 adjacent the end remote from the bell crank lever 16 is a second bell crank lever 22 which is disposed in a horizontal plane and which is pivoted at 23 by means of a rivet, bolt or like device. One arm 24 of the bell crank lever extends laterally and a link 25 connects this arm 24 to any one of the perforations 21 of arm 20. The other arm 26 of the bell crank lever 24 at its extremity is angularly or outwardly bent, as at 27, and this outwardly bent portion is formed with a plurality of openings 28. A rod or link 29 is angularly bent at its opposite ends, one of these ends being extended through any one of the perforations 28 and the opposite end being extended through the perforation in the extremity of a throttle lever arm of the carbureter F. The upwardly extending portion 11 of the bracket 10 is disposed to engage with one of the bolts $g$ which holds the water inlet connection G to the engine block of a Ford engine, and this bolt forms the sole support for the bracket 10 and for the allied mechanism. The arm 27 has engaged with it a chain or other flexible connection 30 which is adapted to be engaged with the crank arm of the regular throttle controlling shaft $e$.

The operation of this device will be evident from what has gone before. Upon the depression of the pedal 18 the arm 20 of the bell crank lever will swing forward, thus swinging the arm 24 of bell crank lever 22 forward and drawing laterally on the arm 26. This will draw laterally on the rod 29 and thus shift the throttle toward its closed position. A coiled contractile spring 31 having one end connected to the arm 24 of bell crank lever 22 and the other end connected to the bracket 10 acts to resist this movement of the bell crank lever 22 and thus urge the throttle to a closed position. Thus as soon as pressure on the accelerator pedal 18 is relieved, the throttle will tend to close under the action of the spring. Inasmuch as there is a flexible connection between the shaft $e$ and arm 26, it follows that any rotation of the shaft $e$ under the action of the hand lever will also act to shift the throttle. The throttle could be thus adjusted by the hand lever adjacent the steering wheel to any desired amount of opening and then if it is desired to open the throttle further, the accelerating pedal may be depressed. Immediately that pressure is relieved on the accelerating pedal, the parts will return to the position to which they have been set by the handle on the shaft $e$. Thus the throttle may be operated independently either by the hand operated device adjacent the automobile steering wheel or by the foot pedal.

It is to be particularly noted that the device is extremely simple, that it may be readily attached to a car without the necessity of employing a skilled mechanic for this purpose, and that the attachment forms a unit in itself. When the attachment is in place upon the car and held by the bolt $g$, the bolt 15 will be held pressed against the engine block so that there will be no danger of this bolt or screw coming out. The head of the pedal is, of course, detachable to permit the shank to be inserted through the opening 19. When the accelerator is in position it becomes really a part of the motor, inasmuch as it is perfectly supported thereby. It is strong, rigid, neat, and compact. The pedal has a quick and positive action on the throttle valve of the carbureter and is particularly desirable in crowded streets or in dangerous places where both hands are needed on the steering wheel.

Preferably I provide a foot rest 32 disposed upon the foot board immediately adjacent the pedal and attached by screws thereto, this foot rest being designed to receive the heel of the driver, while the foot rests upon the pedal. This foot rest is made of resilient material so that in driving over rough roads the jar of the foot will be relieved from the accelerator pedal. This foot rest supports the foot and prevents accidental movement of the accelerator. It is obvious that anyone can install this invention in a few moments. It is simply a matter of loosening the bolt $g$ and slipping the slit or aperture 12 in behind the head of the bolt and then tightening the bolt.

While I have illustrated certain details of construction and arrangement of parts, it will be obvious that these might be varied in minor ways without departing from the spirit of the invention.

I claim:—

1. An accelerator attachment of the character described comprising a supporting bracket adapted to be attached to and carried by the engine, a bell crank lever mounted for movement in a vertical plane and carried upon the supporting bracket at one end, one end of the lever being extended rearward and upward and formed to provide a pedal, a second bell crank mounted upon the bracket adjacent the other end for movement in a horizontal plane and having one end operatively connected to the first named bell crank lever, the other extremity of the bell crank lever being provided with perforations for engagement by the throttle link of the car, and a spring resisting depression of the pedal.

2. An attachment of the character described comprising a bracket and formed to provide an upwardly extending member at one end, this member being perforated for the passage of a bolt, the opposite end of the bracket having an upward extension, a bell crank lever pivoted to said upward extension and having one arm extended downward and the other arm extended rearward and provided with a pedal, a bell crank lever pivoted upon the under side of the bracket beneath the first named extension, a link connecting one arm of the last named bell crank lever with the depending arm of the first named bell crank lever, a contractile spring connected to the bracket and said last named arm, the other arm of the second named bell crank lever being angularly bent and perforated for engagement by a throttle link.

3. An attachment of the character described comprising a bracket and formed to provide an upwardly extending member at one end, this member being perforated for the passage of a bolt, the opposite end of the bracket having an upward extension, a bell crank lever pivoted to said upward extension and having one arm extended downward and the other arm extended rearward and provided with a pedal, a bell crank lever pivoted upon the under side of the bracket beneath the first named extension, a link connecting one arm of the last named bell crank lever with the depending arm of the first named bell crank lever, a contractile spring connected to the bracket and said last named arm, the other arm of the second named bell crank lever being angularly bent, a throttle link engaged with one of said perforations, and a flexible connection leading from another of the perforations and adapted to be connected to the accelerator shaft of the machine.

4. An attachment of the character described comprising a supporting bracket having upward extensions at its opposite ends, one of said extensions being slotted for attachment to the engine block of a motor car, the other extension being bent downward at its upper end, a bell crank lever pivoted between said downwardly bent portion and the body of said extension and having a depending arm and a rearwardly extending arm provided with a pedal, the depending arm at its lower end being formed with a plurality of perforations, a bell crank lever pivoted beneath the other end of the bracket and having one of its arms linked to the depending arm of the first named bell crank lever, the forward end of the second named bell crank lever being angularly bent and provided with perforations, a throttle shaft having a throttle arm, a link connecting the throttle arm to one of the perforations of said last named bell crank lever, a controlling shaft for the throttle having an arm, a flexible connection between said arm and the arm of the second named bell crank lever, and a contractile spring connected to the first named arm of the second named bell crank lever and to said bracket and resisting the opening of the throttle.

In testimony whereof I hereunto affix my signature.

ERNEST R. HADDEN.